Figure 5:
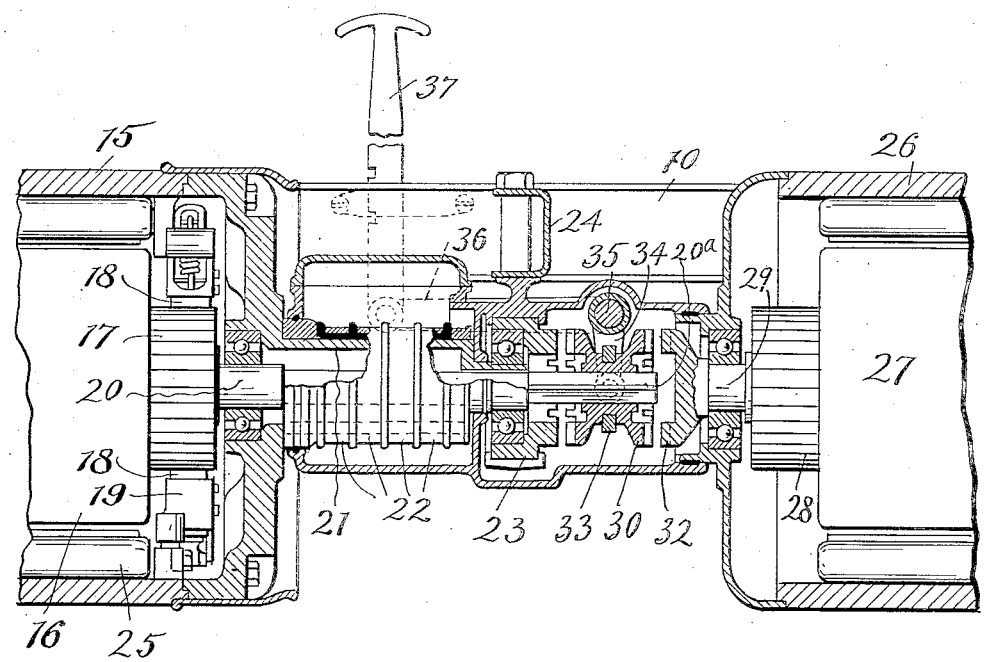

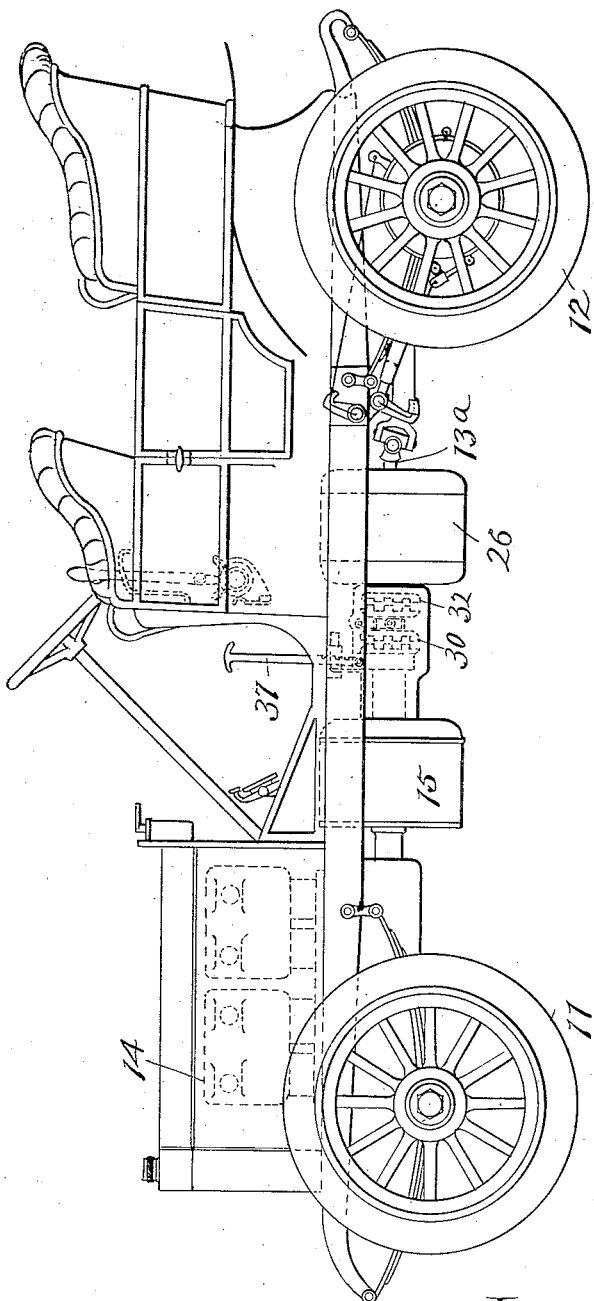

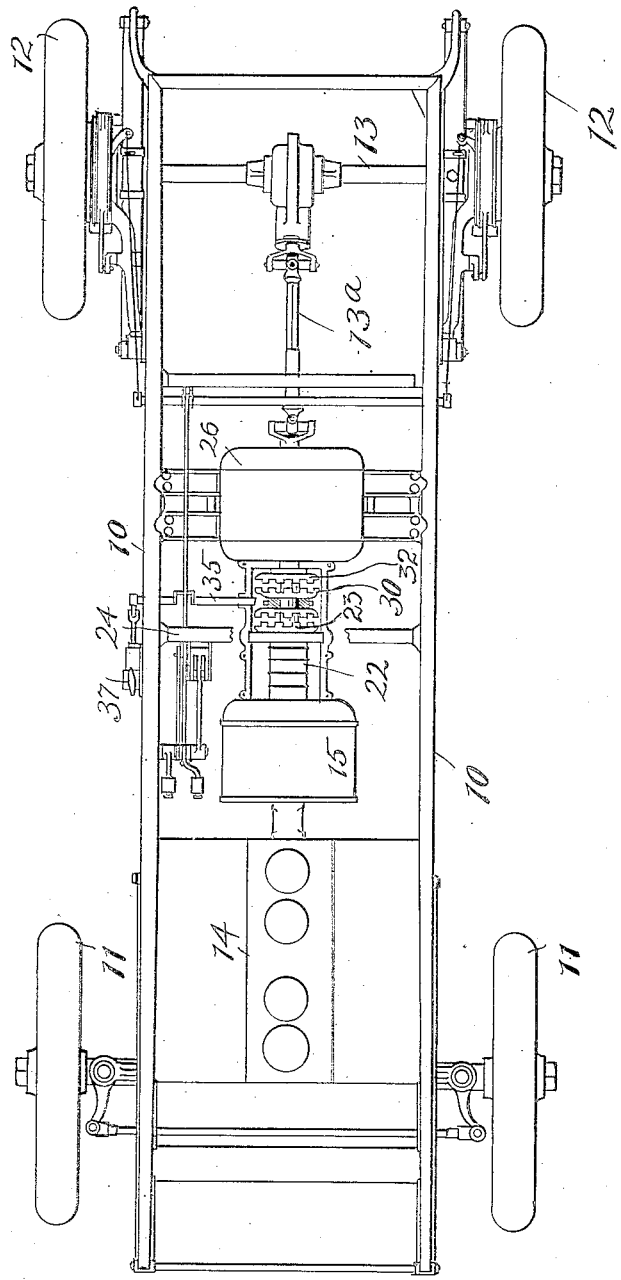

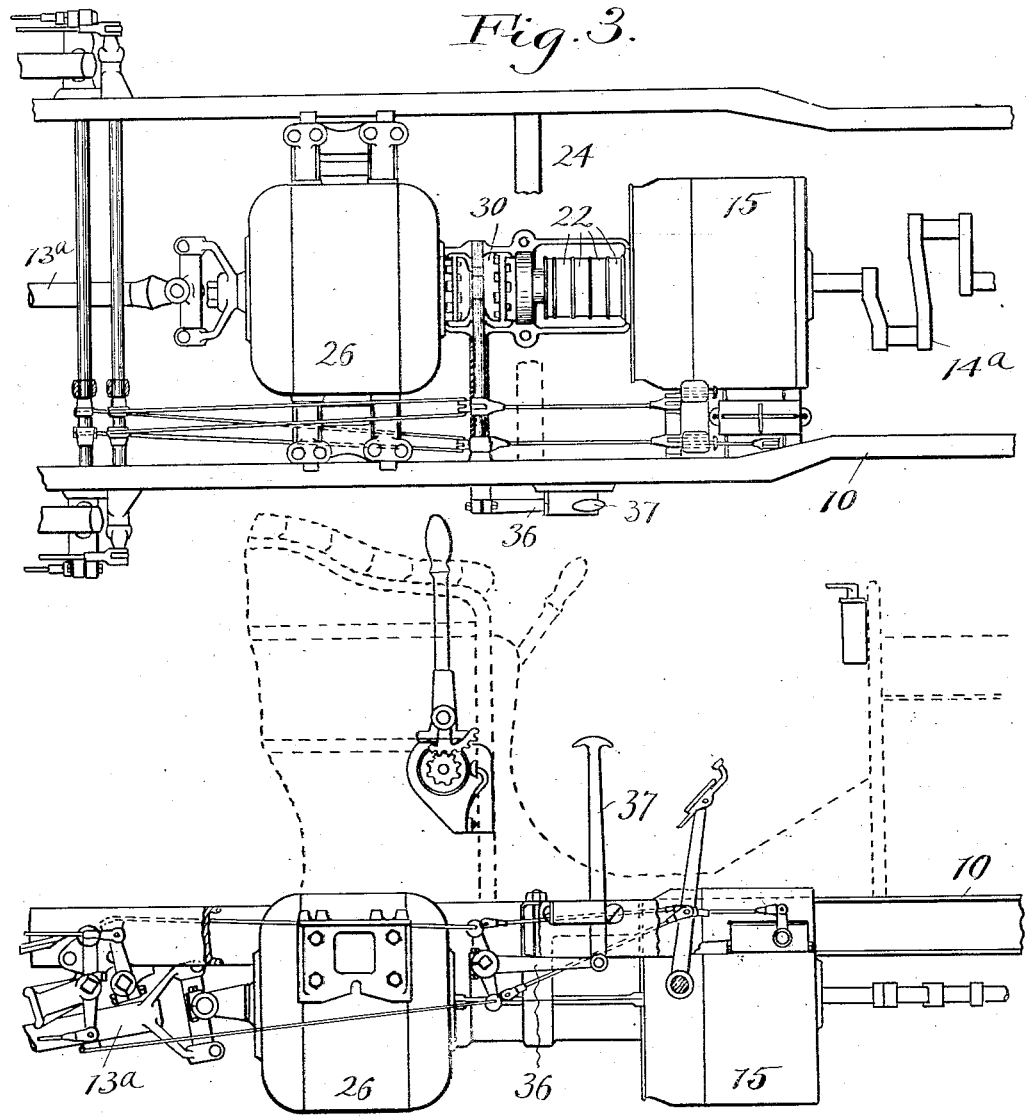

J. B. ENTZ.
MOTOR VEHICLE.
APPLICATION FILED DEC. 13, 1915.

1,258,758.

Patented Mar. 12, 1918.
4 SHEETS—SHEET 4.

UNITED STATES PATENT OFFICE.

JUSTUS B. ENTZ, OF CLEVELAND, OHIO.

MOTOR-VEHICLE.

1,258,758.  Specification of Letters Patent.  Patented Mar. 12, 1918.

Original application filed February 24, 1908, Serial No. 417,309. Divided and this application filed December 13, 1915. Serial No. 66,461.

*To all whom it may concern:*

Be it known that I, JUSTUS B. ENTZ, a citizen of the United States, residing at Cleveland, in the county of Cuyahoga and State of Ohio, have invented a certain new and useful Improvement in Motor-Vehicles, of which the following is a full, clear, and exact description.

This invention relates to motor vehicles and is a division of my prior application Serial No. 417,309 filed February 24, 1908, for a "self-propelled vehicle," a patent having been granted for the invention of said application December 14, 1915, No. 1,164,588.

In my prior application above referred to I have shown a motor vehicle having an electric transmission and control, which, as in my prior Patent No. 732,062, June 30, 1903, includes two dynamo electric machines, one generally termed a generator having two rotary elements one of which is connected to the engine and the other of which is connected or adapted to be connected to the load, and the other dynamo electric machine generally termed the motor having one element stationary and the other connected to the load. The propulsion or transmission system shown in said application includes also a storage battery and controlling means for the establishment of suitable connections by which the vehicle may be driven very efficiently both forward or backward at a plurality of speeds without the necessity for any mechanical change speed gearing, and by which certain other important electrical functions or results are obtained, such as engine cranking, electrical braking and storage battery charging.

The claims in my application above referred to are directed particularly to features of control, whereas the subject-matter of the present application filed as a division of said prior application comprises particularly certain mechanical or structural features, including a clutch between the generator and motor and which permits the motor alone or both the motor and one of the rotary elements of the generator to be connected to the load or running gear for driving or propelling purposes. This clutch in the embodiment of my invention here shown has particular utility as a means for mechanically disconnecting the generator from the motor for reverse drive, in which event the motor alone actuates the load, although in so doing it is electrically connected to the generator and receives current therefrom.

The invention resides also in certain other features of construction and combinations and arrangements of parts which will be described in the specification and set forth in the appended claims.

In the accompanying sheets of drawings, Figure 1 is a side view of a motor vehicle equipped with my invention; Fig. 2 is a top plan view with the body and certain other parts removed; Fig. 3 is a plan view of the electrical elements and interconnections as shown in Fig. 4; Fig. 4 is a side elevation showing the electrical units, controller and other controller means and connections shown as viewed from the far side of the vehicle in Fig. 1; Fig. 5 is a longitudinal vertical section on an enlarged scale showing portions of the field and armature elements of the two dynamo electric machines, and the clutch between the two machines.

In the particular embodiment of my invention shown, the invention is utilized in a propulsion system of a motor vehicle which includes a chassis frame 10, steering wheels, 11, driving wheels 12, a rear axle designated as a whole by the reference character 13, and a propeller shaft 13ª which may be connected through differential gearing to the live axle sections in the usual manner. The vehicle includes also an engine 14 which is here shown as a four-cylinder internal combustion engine and constitutes the prime mover or primary source of power in the vehicle. Between the engine and the propeller shaft or running gear are two dynamo electric machines, the first of which will for convenience be termed the generator and the second the motor. The generator is provided with a rotary field element 15 which is connected to the crank shaft 14ª of the engine 14 and a rotary armature 16 which is adapted to be and is normally connected to the load, *i. e.*, to the propeller shaft, although it may be disconnected therefrom as will subsequently appear. The generator includes also a commutator 17 and suitable brushes 18 supported in brush holders 19 carried by the field frame.

The armature of the generator is mounted on a shaft 20 which is supported at the front and rear portions of the field frame. The latter is provided with a rearward extension 21 which constitutes a support for collector rings 22 and the rear end of which has a bearing in a member 23 in turn supported by a cross member 24 of the chassis frame. Two of the collector rings 22 are employed for conducting current to and from the field winding 25 of the generator and the other two are electrically connected to the brushes 18 as is more fully explained in my prior application.

It will be observed in passing that the armature shaft 20 extends rearwardly through the field frame extension 21 and beyond the end thereof, the rear end of this shaft shown at 20ª being squared or otherwise formed to accommodate the axially movable member of a clutch to be referred to presently.

The motor which is between the generator and the rear axle includes a stationary field frame 26, a rotary armature 27, a commutator 28, the armature and commutator being supported on a shaft 29, the rear end of which, as shown, is coupled to the propeller shaft.

Between the generator and the motor I provide a clutch including a movable clutch member 30 which is mounted on and movable axially of the squared rear portion 20ª of the generator shaft 20. This clutch member 30 is provided with clutch jaws at each end, and when moved forwardly is adapted to coöperate with suitable clutch jaws of the stationary clutch member 23. When moved rearwardly the clutch member 30 is adapted to engage clutch jaws 32 at the forward end of the motor shaft 29. The clutch member 30 carries a ring 33 which is engaged by a yoke 34 mounted upon a shaft or stud 35 and adapted to be rocked by a forwardly projecting arm 36 connected to an upstanding clutch operating rod or arm 37 which is within reach of the operator when occupying the seat of the vehicle. This rod 37 is held by a spring detent in any one of two positions, viz: with the clutch member 30 in locked engagement with the fixed clutch member 23 or in the opposite position in locked engagement with clutch face or jaws 32 of the motor shaft.

The above structure constitutes a principal part of the present invention, but for a complete understanding of the remaining parts here shown but not described in detail such as the starting controller L, the main controller E, the pedal K which is adapted to apply a mechanical brake to the vehicle and at the same time operate a generator short-circuiting switch 1, reference is had to my prior patent previously referred to.

As is fully described in my prior patent, the generator is utilized as a motor to start the engine and thereafter is employed as a generator and as a magnetic clutch, the said generator transmitting the full turning effort of the engine to the load and at the same time supplying current to the motor. As the clutching action or turning effort of the generator is always in the same direction as the direction of engine rotation and is in the opposite direction to the direction of rotation of the armature of the motor during reverse drive, the mechanical clutch has been provided between the motor and the generator to couple together the shaft of the generator and the shaft of the motor when the motor and generator are exerting a turning effort in the same direction and to disconnect them and hold the generator shaft stationary when the turning effort on the propeller shaft is opposite in direction to that during normal or forward drive. In other words, for all speeds forward the greatest efficiency is obtained by coupling the two shafts together, whereas while the controller is in position for reverse drive efficient results are obtained by unclutching the generator and motor shafts and holding the generator armature stationary so that the motor armature is alone connected to the running gear. Therefore, for all speeds forward the clutch controlling rod 37 will be in position such as to cause the two shafts to be locked together. When it is desired to reverse the vehicle, the clutch is shifted so as to disconnect the motor and generator shafts and to hold the generator shaft stationary. I am thus enabled in a simple and convenient manner to drive the vehicle backward without the necessity of any reversing gear.

Having thus described my invention, what I claim is:—

1. In a system for transmitting power from a prime mover to a load, a prime mover, electrical means for converting and transmitting power to the load, including a generator having rotatable field and armature elements, one connected to the prime mover, a motor connected to the load, and means for mechanically disconnecting or connecting the second rotary element of the generator and the rotary element of the motor.

2. In a self-propelled vehicle including a shaft to be driven, a prime mover, electrical means for converting and transmitting power to said shaft including a dynamo electric machine with two rotatable elements, one connected to the prime mover, means for mechanically connecting the other of said elements to said shaft and for disconnecting the same therefrom, and a motor connected to said shaft and adapted to receive current from the generator.

3. In combination in a vehicle including a shaft to be driven, a prime mover, an electric generator having a rotary field element connected to the prime mover and a rotary armature, means for clutching said armature to said shaft or disconnecting it therefrom and holding it stationary, and a motor connected to said shaft and adapted to receive current from the generator.

4. In a self-propelled vehicle, a prime mover, means for converting and transmitting energy to the driven wheels including a generator unit with rotating field and armature elements capable of transmitting mechanical and electrical energy in varying amounts, a driving shaft, means for mechanically disconnecting said unit from said driving shaft and interrupting the transmission of mechanical energy, and a motor connected to said shaft and adapted to receive current from the generator.

5. In a self propelled vehicle and in combination with the driving axle thereof, electrical transmission mechanism for converting and transmitting power to the driving axle including an electrical unit with rotating field and armature elements, a second unit located between said first unit and said axle and having a rotary element connected to the latter, and means whereby said rotary element of said second unit may be mechanically connected to one of the rotary elements of the first unit or disconnected therefrom, whereby power may be transmitted mechanically to the axle by both units, or the second unit may transmit power to the axle mechanically independent of the first unit.

6. In a power transmitting device, the combination with a generator having a rotary armature member and a rotary field member and a motor having a rotary armature member and a fixed field member; of means for rotating the field member of said generator and means for coupling together and uncoupling the generator armature member and the motor armature member.

7. In combination with a prime mover, means for transmitting power from the prime mover to a load, said means including a dynamo electric machine having rotary armature and field elements, one connected to the prime mover and the other adapted to be connected to the load, a second dynamo electric machine, one element of which is stationary and the other connected to the load, and a clutch between the first and second dynamo electric machines by which the second named rotary element of the first machine and the rotary element of the second machine may be clutched together or may be disconnected.

8. In a motor vehicle, an engine, a dynamo electric machine having rotary field and armature elements, one connected to the engine, a motor adapted to receive current from said machine and having one element stationary and the other rotatable, a shaft to which the rotatable element of the motor is connected, and a clutch by which the second rotary element of said dynamo electric machine and the rotary element of the motor may be coupled together or disconnected.

9. In a system for transmitting power from a prime mover to a load, a prime mover, an electrical unit having rotary armature and field elements, one connected to the prime mover and the other adapted to be connected to and disconnected from the load, a second unit between the first unit and the load and adapted to receive current from the first unit, said second unit having a stationary element and a rotary element connected to the load, and means whereby said rotary element of the second unit may be mechanically connected to or disconnected from the other rotary element of the first unit.

10. In a system for transmitting power from a primary mover to a load, a prime mover, an electrical unit having rotary field and armature elements one connected to the prime mover, a second electrical unit between the first unit and the load and adapted to receive current from the first unit, said second unit having a stationary element and a rotary element connected to the load, and means for mechanically connecting the rotary element of the second unit to the other rotary element of the first unit or disconnecting said elements and holding said other rotary element of the first unit stationary.

In testimony whereof, I hereunto affix my signature in the presence of two witnesses.

JUSTUS B. ENTZ.

Witnesses:
 RAMSAY ROGERS,
 WALTER S. JONES.